United States Patent [19]
Dianda et al.

[11] Patent Number: 5,631,903
[45] Date of Patent: May 20, 1997

[54] TELECOMMUNICATIONS SIGNALING ARRANGEMENTS FOR TERMINALS WITHOUT SIGNALING CAPABILITY

[75] Inventors: Robert B. Dianda, Wheaton; Roger E. Libman, Naperville; Suzanne Vondruska, Aurora; Hsien-Chuen Yu, Naperville, all of Ill.

[73] Assignee: Lucent Technologies Inc., Murray Hill, N.J.

[21] Appl. No.: 557,885

[22] Filed: Nov. 14, 1995

Related U.S. Application Data

[63] Continuation of Ser. No. 235,599, Apr. 29, 1994, abandoned.

[51] Int. Cl.$^6$ .................................................. H04L 12/50
[52] U.S. Cl. .............................. 370/401; 370/410; 348/7
[58] Field of Search ................................. 370/110.1, 91, 370/92, 93, 94.1, 58.1, 58.2, 58.3, 60, 60.1, 62, 68.1, 85.7, 85.9, 85.13; 348/7, 10, 12, 13, 14, 16; 379/229, 234, 242, 245, 280

[56] References Cited

U.S. PATENT DOCUMENTS

| | | | |
|---|---|---|---|
| 4,450,477 | 5/1984 | Lovett | 358/86 |
| 4,577,314 | 3/1986 | Chu et al. | 370/110.1 |
| 5,115,426 | 5/1992 | Spanke | 370/110.1 |
| 5,200,952 | 4/1993 | Bernstein et al. | 370/94.1 |

FOREIGN PATENT DOCUMENTS

| | | |
|---|---|---|
| 0132464 | 7/1983 | European Pat. Off. |

OTHER PUBLICATIONS

A. D. Gelman et al., "A Store–And–Forward Architecture For Video–On–Demand Service", ICC '91—Conference Record, vol. 2 of 3, Jun. 1991, pp. 842–846.

ITU–Telecommunications Standardization Sector, Study Group 11, Temporary Document DT.157, Edinburgh, Jun. 13–21, 1994, sections 4 and 5.

S. Subramanian: Proposed Mechanisms For Third Party Connection Setup; Contribution to ATM Forum Technical Committee Signaling SWG for Meeting May 10, 1994; (Sent by E–Mail to members of Signaling SWG on Apr. 26, 1994).

S. Subramanian et al.: Phase 2 Requirement—Third Party Call Setup; Contribution to ATM Forum Technical Committee, Signaling SWG, Mar. 21, 1994.

C. Chiang et al.: Proposed Requirements for Third Party Call Setup; Contribution to ATM Forum Technical Committee, Signaling SWG for Meeting May 10, 1994. (Sent by E–Mail to members of Signaling SWG on Apr. 25, 1994).

*Primary Examiner*—Wellington Chin
*Assistant Examiner*—Huy D. Vu

[57] ABSTRACT

An arrangement for generating and receiving standard telecommunications network signals on behalf of a terminal not equipped to generate or receive such signals. A controller shared by a plurality of such terminals receives signals from these terminals over a permanent virtual circuit (PVC) and uses the information received over the PVC to perform signaling. In a specific embodiment, the terminals are set top boxes, connected to a video cable, for controlling television sets. The controller controls signaling for establishing connections between the set top box and a video vendor system, and tunes the set top box to receive signals on the proper channel. Advantageously, such an arrangement significantly reduces the cost of the set top box while still allowing for a highly flexible signaling arrangement to the video vendor system.

18 Claims, 2 Drawing Sheets

TELECOMMUNICATIONS SIGNALING ARRANGEMENTS FOR TERMINALS WITHOUT SIGNALING CAPABILITY

This application is a continuation of application Ser. No. 08/235,599, filed on Apr. 29, 1994 now abandoned.

TECHNICAL FIELD

This invention relates to arrangements for signaling in a standard telecommunications systems protocol on behalf of terminals lacking that capability.

PROBLEM

Signaling between customer stations and a telecommunications network has always been a fundamental requirement of switchable telecommunications networks. The most primitive form of sign fling is the dial pulses used initially to control switches directly and subsequently used simply as a means of conveying to a switching system the telephone number of a called customer. Dial pulse signaling has been largely replaced in the United States by dual tone multifrequency signaling, a system which still has the same fundamental purpose, namely, to convey to the public switched telephone network the identification of a called customer.

More modem systems such as the integrated services digital network (ISDN) use much more sophisticated signaling systems to convey a great deal of additional information including characteristics of a call (e.g., priority), identification of a caller, special charge information in case a call is to be charged to an entity other than that identified by the calling customer's telephone number, amount of bandwidth required for a call and special information (such as a name) to be sent to a called party. The integrated services digital network provides a D-channel having a bandwidth of 16 kilobits/second for transmitting and receiving such signaling information when the party is connected via basic rate interface or a 64 kilobit D-channel for 23 or 30 grouped lines as in the case of a private branch exchange (PBX).

A problem with the use of such complex signaling systems and the protocols which are used to control and interpret the information transmitted in a signaling message is that the cost of controlling such signaling systems is high. While this cost may be tolerable, for example, for ISDN stations which offer substantial benefits to those users willing to pay for ISDN facilities, such a cost is a serious problem for the introduction of video on demand type cable television (TV) systems in which the control unit (normally referred to as a set top box) must be provided for every receiving television set and therefore adds very substantially to the cost of such cable systems. A problem of the prior art therefore is that where elaborate signaling systems are required the cost of providing these systems remains high.

SOLUTION

In accordance with one exemplary embodiment of applicants' invention, messages similar to that used for communicating between a remote control and a video cassette recorder (VCR) are used for communicating data to a centralized controller system, in this case, a Level 1 Gateway (L1G). The data is sent over a permanent virtual circuit (i.e., a virtual circuit used by a particular device only when that device is actually transmitting or receiving information) to a L1G shared by the set top boxes of a large number of TV sets. The arrangement used in remote controls to convert the pushing of a button into a short data message is used to generate the data messages which are sent to the L1G. The L1G then uses the data from these messages to control the establishment of a connection between the requesting set top box and a video server for providing the video on demand program. Using a signaling message in ITU-T (formerly CCITT) draft recommendation Q.2931, the L1G signals the broadband network interconnecting the set top box and video server to establish a connection between the two. No communication connection is established between the L1G and the video server or the video server controller. Advantageously, the set top box can communicate requests for a connection to the L1G, which requests are passed in modem telecommunications systems signaling messages by the L1G to the broadband network, without the set top box being required to meet the protocols of, for example, ITU-T Broadband ISDN (B-ISDN) signaling messages.

Accordingly, applicants' invention relates to arrangements for generating complex signaling messages for telecommunications networks without requiting the communicating entities to generate such messages.

DETAILED DESCRIPTION

Figure 1:
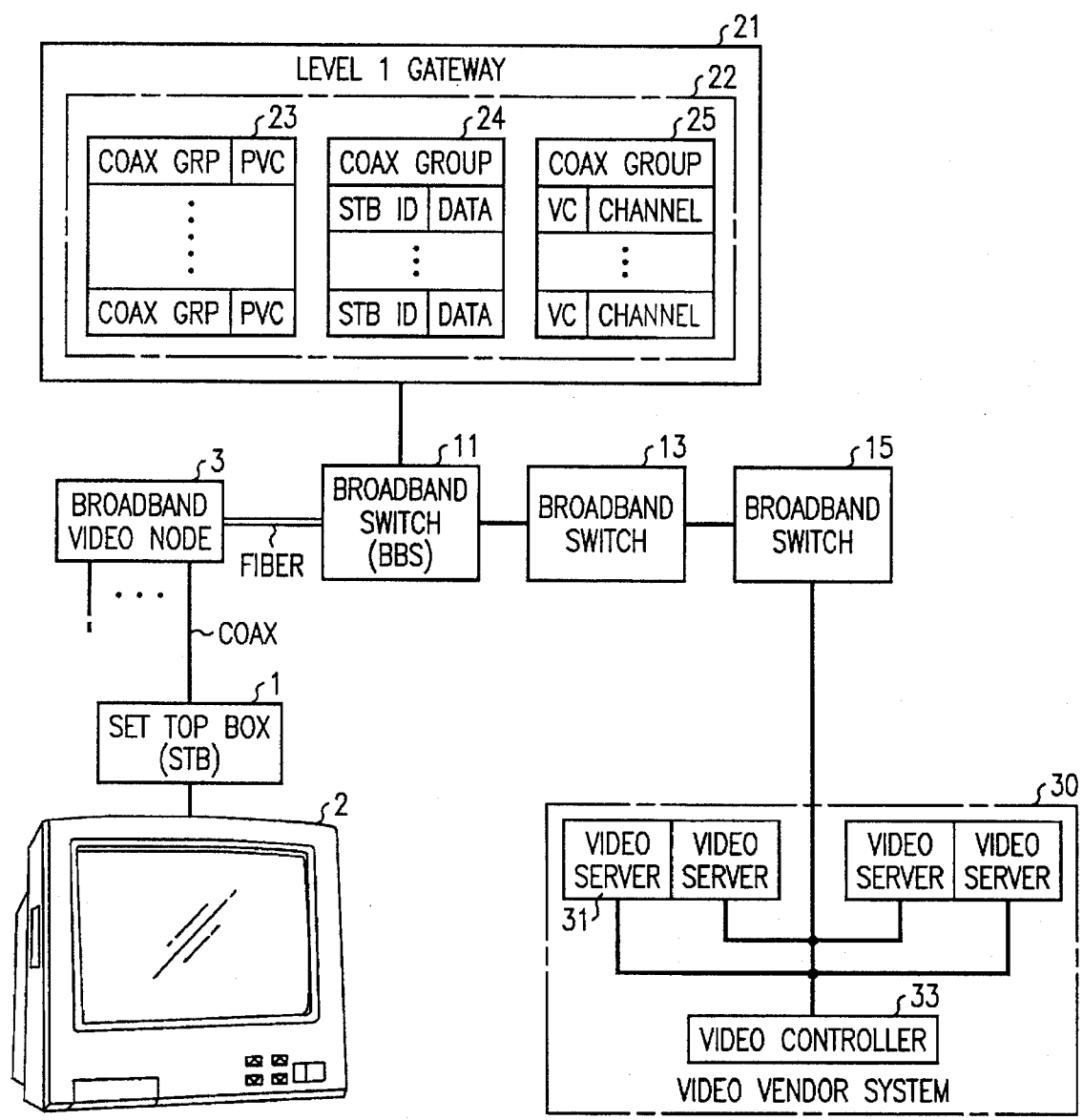
FIG. 1 is a block diagram illustrating an exemplary embodiment of applicants' invention.

FIG. 1 is a block diagram illustrating the operation of the applicants' invention. A set top box 1 is connected to a TV set 2. A group of perhaps fifty set top boxes are connected via a coaxial cable feeder to a broadband video node 3. For each coaxial cable feeder, the broadband video node performs two types of conversions: it converts uni-directional broadband video signals transported via ATM cells on an ATM connection into a digital or analog video signal transported via a video channel on the coaxial cable feeder; and, it converts between bidirectional messages transported via ATM cells on an ATM connection and messages transported via a bi-directional channel on the coaxial cable feeder. The mapping from ATM connections to coaxial channels is provisioned (i.e., ATM cells arriving arriving at the video node on a particular ATM connection (as identified by the ATM header) will always be converted to signals on the same channel on the same coaxial cable feeder and signals arriving at the video node on a particular channel on a particular coaxial cable feeder will be convened to broadband signals on the same ATM connection). The Level 1 Gateway (L1G) 21 has knowledge of this mapping between ATM connections and coaxial cable channels.

The broadband video node is connected to a broadband switch 11. The broadband switch provides permanent control connections between the video node and the L1G to provide the set top box to L1G communication paths. (In the preferred embodiment, there is one such permanent ATM connection per coaxial cable feeder; in alternate embodiments, individual ATM control connections may be provided to each set top box, or alternatively, several coaxial cables may share one ATM control connection.) In addition, the broadband switch establishes switched connections between the video node and video vendor systems based on signaling between the broadband switch and the L1G.

The Level 1 Gateway 21 receives signals generated by users and passed on by the set top box over a channel on the coaxial feeder to the video node 3 which then sends the signal via ATM to the broadband switch which then delivers it to the L1G. In the preferred embodiment, on each coaxial cable, one of the bi-directional channels is used to provide a communication path between the set top boxes 1 and the L1G 21; i.e., all the set top boxes on a coaxial cable feeder share the one channel for communicating with the LIG. (In the future, the coaxial cables may be replaced by fibers.) The signals from the set top box contain the required data elements (button pushed and identification of the set top box). The required data includes, for example, a choice of video vendor, and the required identification of the set top box. Messages from the L1G to the set top box provide for a simple menu to be displayed on TV set 2. The user makes menu selections by pushing buttons on the set top box. The L1G has a signaling channel to Broadband switch 1 that is used to control the establishment and removal of switched connections to video node 3.

Stored in Level 1 Gateway 21 is information block 22. This block includes translations associating a coax group with the permanent virtual circuit for communicating with set top boxes in that coax group, the identity of each set top box in a coax group and the corresponding data (including such information as whether the owner of the set top box has paid his or her bills) and the association of a virtual channel for communicating via the broadband video node to the corresponding channel in the coax group so that the Level 1 Gateway can signal to the set top box to tune to the channel that corresponds to the virtual channel over which a program is being transmitted or the narrowband channel over which data is being exchanged with the video vendor.

Figure 2:
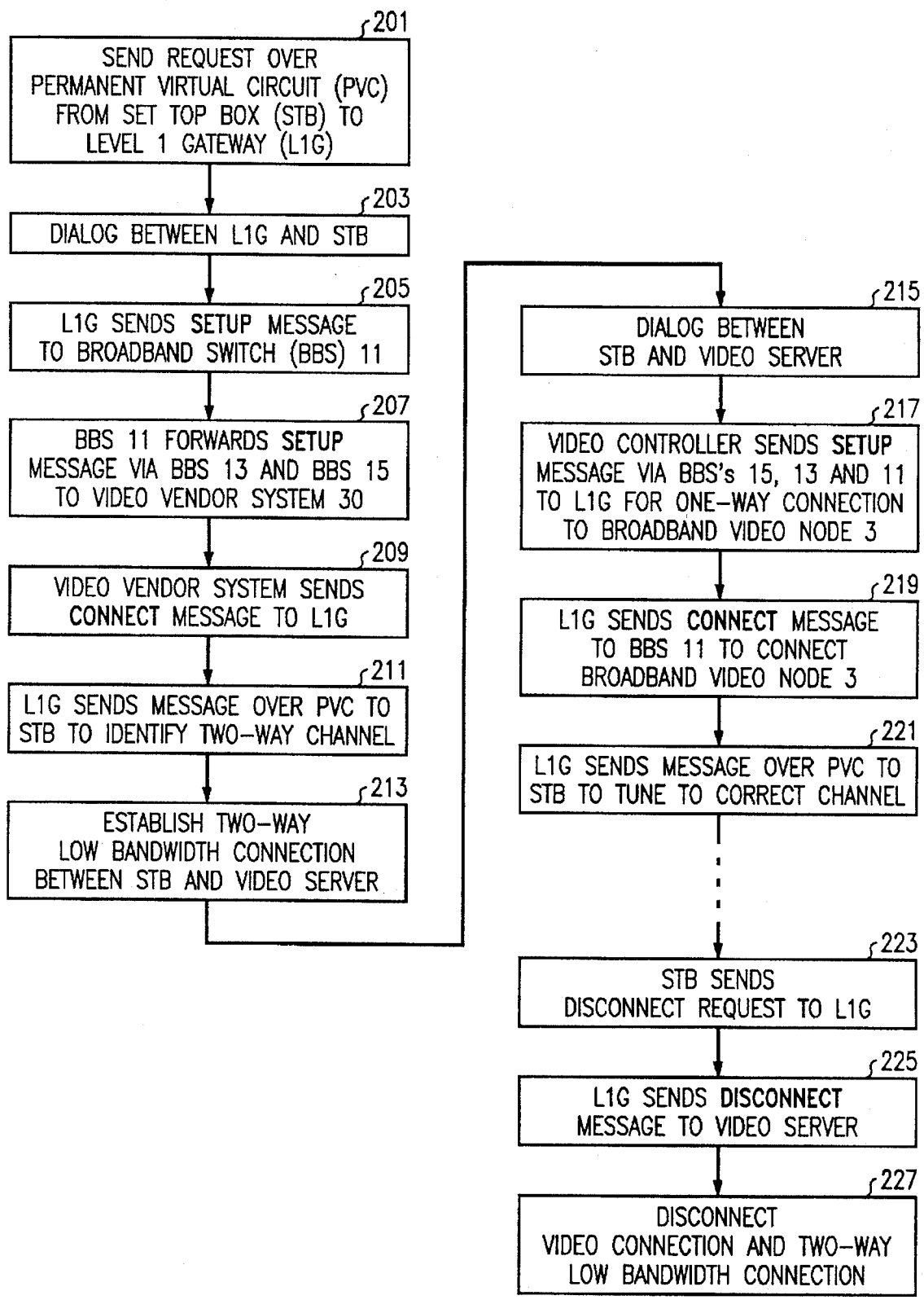
FIG. 2 is a flow diagram illustrating the operation of the invention.

FIG. 2 is a flow diagram of the actions executed in establishing and disconnecting a connection between a video server and a set top box. The process is initiated when a request for service is sent over the permanent virtual circuit from the set top box to the Level 1 Gateway (action block 201). In this particular embodiment, all the set top boxes connected to a particular coaxial cable feeder share a common permanent virtual circuit (PVC) to the L1G. In other embodiments, subgroups of this set of set top boxes may be connected to different permanent virtual circuits. The permanent virtual circuit is identified at the set top box by a particular bi-directional channel on the coaxial cable feeder and at the Level 1 Gateway by a particular virtual channel connection (identified by a specific virtual path identifier (VPI) and virtual channel identifier (VCI) value) on a broadband ISDN (B-ISDN) interface. The particular set top box is further identified by data in the data field of the message so that only the set top box which is the destination of a message from the Level 1 Gateway will accept that message. Similarly for messages from the set top box to the Level 1 Gateway, the message conveyed via ATM cells must include the identity of the set top box generating the message.

In this description, in order to focus upon the invention, no description of the well known auxiliary messages, such as acknowledgment messages, described in the international protocol documents and well known to practitioners in the field, are not described.

Once the service request has been recognized by the Level 1 Gateway, a dialog ensues between the Level 1 Gateway and the set top box in order to determine which video vendor should handle the request for video service (action block 203). After this dialog has been completed to the point where the Level 1 Gateway has established that the customer associated with the set top box is truly requesting service and has provided enough information to identify the video vendor, the Level 1 Gateway sends a SETUP message to broadband switch 11 (action block 205) requesting the establishment of a bi-directional communication connection between video node 3 and a video vendor 30. The video vendor's equipment comprises a plurality of video servers and a video server controller. The setup request is processed through the broadband switches 11, 13, and 15 using an interswitch signaling protocol (e.g., Broadband ISDN User Part (BISUP) of Signaling System No. 7) to establish the interswitch portion of the communication connection (action block 207).

This SETUP message will result in broadband switch 15 sending a SETUP message to video controller 33. Video controller 33 in response to data received in the SETUP message, selects an appropriate video server 31 and signals via a CONNECT message to broadband switch 15 for the establishment of a connection to video server 31 and for the completion of the connection back to video node 3 (action block 209). This will result in the Level 1 Gateway receiving a CONNECT message from broadband switch 11, (the indication of a connection completion is forwarded by way of interswitch signaling protocol messages through broadband switches 11, 13, and 15). The Level 1 Gateway 21 sends a message over the PVC to set top box 1 identifying the bi-directional channel on the coaxial feeder that the set top box will use to communicate with the video server 31 (action block 211). The connection which is set up (action block 213) as a result of the actions described so far is a low bandwidth connection for communicating menu information and menu selection responses between the video server and the set top box.

Alternatively, the initiation of the establishment of the low bandwidth connection can be a function of the video vendor system. This would be in response to a message from the L1G to the video vendor system identifying the set top box request.

A dialog now takes place (action block 215) over the narrowband connection between the set top box and the video server with the objective of selecting a video program and verifying its availability. If no satisfactory video program is available, the low bandwidth connection is disconnected. However, if the results of the dialog between the set top box and the video server are satisfactory and an acceptable video program is identified, then the video server 31 communicates to video controller 33. Video controller 33 sends a SETUP message to broadband switch 15 with the objective of establishing a uni-directional broadband communication connection between video server 31 and video node 3 (action block 217). A communication connection is established using Signaling System No. 7 messages from broadband switch 15 to broadband switch 13 and then to broadband switch 11. Broadband switch 11 sends a SETUP message to Level 1 Gateway 21 which, based on information in the SETUP message, sends a CONNECT message, which specifies the connection between video node 3 and broadband switch 11, to broadband switch 11 for the establishment of a connection to video node 3 (action block 219). The Level 1 Gateway sends a message over the PVC to set top box 1 identifying the channel to which the set top box should tune for the selected video program (action block 221). The bi-directional connection that was established is now used to control the video program (e.g. fast forward, rewind, pause).

A connection, initiated by the video vendor system, can be completed in essentially the same way, merely skipping the steps prior to step 209, and using a SETUP message from the video vendor system to the L1G. For such a connection, for example, if the video program is pre-ordered, the initial dialog between the video vendor system and the set top box can also be skipped or curtailed.

The two switched communication connections can be released (action block 227) by either the Level 1 Gateway (action block 225) or the video controller sending a RELEASE message to broadband switch 11 or 15, respectively, for each connection. The release of the connections could be as a result of the user signaling the Level 1 Gateway (via the PVC from the set top box) (action block 223) or of the user signaling the video server (via the bi-directional communication from the set top box) or for other reasons (e.g., end of video program).

The SETUP message sent by the Level 1 Gateway in order to establish the call to the video server is a standard SETUP message of a type specified in the broadband digital subscriber signaling system no. 2 (DSS2) standards of ITU-T. It contains fields describing the bearer capability (e.g., constant or variable bit rate, data, voice), an ATM traffic descriptor (the expected bandwidth of the signals to be sent over the connection), the quality of service (allowable delay and loss criteria), the called party number, the called party subaddress (additional addressing information that is passed transparently by the network to the end user), the calling party number, the calling party subaddress, a connection identifier to identify the virtual channel connection to be used for the connection, and a field for specialized user to user information that is simply transmitted transparently to the destination and may contain items such as special protocol information. Another use of user to user information is to convey non-standard information, such as specialized video encoding information, in a protocol agreed upon between the Level 1 Gateway and the video vendor for specialized information not in the ITU-T standards.

The virtual channel connection (VCC) is identified by the L1G in the SETUP or CONNECT message by two parameters, the Virtual Path Connection Identifier (VPCI) and the Virtual Channel Identifier (VCI). In this case, the VPCI is mapped to a physical interface (i.e., one of the interfaces to video node 3) and a Virtual Path Identifier (VPI) value on the interface (i.e., the VCC is identified by a combination of VPI and VCI values on a specific interface and all cells for this VCC on this interface will use these values of VPI and VCI in the cell header). The mapping between VPCI and physical interface and VPI is established when provisioning the signaling virtual channel between the Level 1 Gateway and the broadband switch. This provisioning also includes an indication that the broadband switch is to allow the user (i.e., Level 1 Gateway) to select the VCC to be used for a call.

The SETUP message sent by the video controller in order to establish the call to video node 3 contains the same type of information. The Called Party Number and Called Party Subaddress is based on the received values of the Calling Party Number and the Calling Party Subaddress contained in the SETUP message from the Level 1 Gateway. The SETUP message and CONNECT message are specified in the ITU-T draft recommendation Q.2931: International Telecommunication Union-Telecommunication Standardization Sector (ITU-T) COM 11- R 59, March 1994, "Part II.20-Draft New ITU-T Recommendation Q.2931."

In this preferred embodiment a single permanent virtual circuit exists between the Level 1 Gateway and all the set top boxes on a coaxial cable feeder controlled by that gateway and the set top box picks out those messages destined for the particular set top box on the basis of data within a message. Alternatively, the set top boxes on several coaxial cables can share one PVC. An alternative implementation could have a separate permanent virtual circuit between each set top box and the Level 1 Gateway so that the data of the message would not have to be examined in order to select those messages destined for a particular set top box.

The broadband video node 3 performs two types of conversions: it converts uni-directional broadband video signals transported by ATM cells into digital or analog video signals (depending on the type of TV set supported), one such video signal per channel on the coaxial cable; and it converts bi-directional communication signals from and to the coaxial cable to ATM signals for transmission to the broadband switch 11.

The mapping of ATM channels to coaxial channels is provisioned and effectively made permanent in the video node 3. The Level 1 Gateway has knowledge of this mapping so that it can select an ATM channel for transmission to the video node 3 with the knowledge that this particular ATM channel will be converted into a particular video channel on the coax cable connected to the selected set top box. The Level 1 Gateway can then tune that set top box to the correct channel using a message transmitted over the permanent virtual circuit connecting the Level 1 Gateway with the set top box.

The Level 1 Gateway need not be attached to the same broadband switch as the video node, but can have a signaling connection to the broadband switch serving the video node. The Level 1 Gateway then performs the same functions described above in essentially the same manner. The messages to the set top box must traverse more than one switch to the L1G.

In general, a local controller can perform standard telecommunications signaling on behalf of a plurality of terminals by inserting the identity of the channel (i.e., including interface identification and channel identification within that interface) to be used between the switch and the particular terminal for which it is performing the signaling function in any specific message. The communications connections are then established to the terminal, while the local controller remains the source and destination of signaling messages, using the Q.2931 protocol among others.

In an alternative configuration, the video vendor system or its equivalent in another application can also have its signaling performed by a Level 1 Gateway, essentially as this is done for the set top box.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of establishing a connection in a telecommunications network between a first terminal, said first terminal having no capability for generating telecommunications signaling protocol messages, and a second terminal, comprising the steps of:

in a centralized controller system shared by a plurality of terminals, storing data that when conveyed to the network will identify a path from said network to said first terminal, said data for identifying a path for a connection from said network to said first terminal;

establishing a permanent virtual circuit (PVC) between a set of terminals, said set having at least one member and including said first terminal, and said centralized controller system;

sending a service request message set, said service request message set comprising data for identifying said first terminal and said second terminal, over said PVC from said first terminal to said centralized controller system;

responsive to a receipt of said service request message set, signaling a network controller of said telecommunications network from said centralized controller system, using telecommunications network protocol messages, to establish said requested connection to said second terminal and, using the data stored in said centralized controller system, to said first terminal;

wherein said first terminal lacks a capability for generating telecommunications network protocol messages for requesting said telecommunications network to establish a call;

wherein said centralized controller system is separate from but connected to said network by a data circuit.

2. The method of claim 1 wherein said data for identifying a path comprises an interface identifier and a channel identifier and wherein said interface identifier is interpreted by said network controller of said network as data to select a path for accessing a node connected to said first terminal, and said channel identifier is interpreted by said node as data for selecting a channel, within said path, to said first terminal.

3. The method of claim 2 wherein said interface identifier is a virtual path connection identifier and said channel identifier is a virtual channel identifier.

4. The method of claim 1 wherein the step of establishing said permanent virtual circuit comprises the step of establishing a permanent virtual circuit via a plurality of switching systems.

5. The method of claim 1 wherein said telecommunications network is a broadband integrated services digital network (ISDN).

6. The method of claim 5 wherein said connection to said second terminal is requested by said centralized controller system sending a digital subscriber signaling system no. 2 (DSS2) SETUP message to said network controller of said network.

7. The method of claim 6 wherein said SETUP message comprises data for use by said second terminal in processing communications of said connection.

8. The method of claim 1 wherein the step of sending a service request message set comprises sending a plurality of messages over said PVC to said centralized controller system.

9. The method of claim 8 further comprising sending at least one message over said PVC from said centralized controller system to said first terminal prior to receiving a last one of said service request message set.

10. A method of establishing via a telecommunications network, a video connection between a video vendor system and a set top box, said set top box having no capability for generating telecommunications signaling protocol messages, comprising the steps of:

storing data for establishing a connection between a broadband switching system and said set top box;

establishing a permanent virtual circuit (PVC) between said set top box and a centralized controller system for serving a plurality of set top boxes;

sending a service request message set over said PVC from said set top box to said centralized controller system, said service request message set comprising data for identifying said set top box and said video vendor system;

responsive to a receipt of said service request message set, signaling a network controller of said telecommunications network from said centralized controller system, using telecommunications network protocol messages, to establish said requested connection to said second terminal and, using the data stored in said centralized controller System, to said first terminal;

establishing a video connection between said video vendor system and said broadband switching system;

sending a message from said centralized controller system to said set top box to tune to one of a plurality of video channels for transmission of video signals via said set top box to a connected receiver; and establishing a connection between said video connection and said set top box, via means for converting signals received from said video connection to signals for said plurality of video channels, using the stored data;

wherein said first terminal lacks a capability for generating telecommunications network protocol messages for requesting said telecommunications network to establish a call.

11. The method of claim 10 further comprising the steps of:

Responsive to receiving said service request message set in said centralized controller system, establishing a separate connection between said video vendor system and said set top box; and wherein the step of establishing said connection between said video connection and said means for converting signals is performed in response to signals received by said centralized controller system from said video vendor system, said signals from said video vendor system generated in response to receipt of further request data over said separate connection between said set top box and said video vendor.

12. The method of claim 11 wherein the step of establishing a separate connection comprises the step of sending a SETUP message from said centralized controller system to said controller of said network.

13. The method of claim 10 wherein said message to tune to a video channel is sent over said PVC.

14. The method of claim 10 wherein the step of establishing a PVC comprises establishing a PVC via a plurality of switching systems.

15. The method of claim 10 wherein a plurality of set top boxes are connected to a coaxial cable and wherein a single PVC serves said plurality of set top boxes.

16. The method of claim 10 wherein said data for establishing a connection comprises data in said centralized controller system for identifying a path in said switching system, and data in said switching system for responding to signals from said centralized controller system for establishing said path.

17. The method of claim 16 wherein said data for establishing a connection further comprises data for selecting a specific channel to said set top box.

18. A method of establishing a connection in a telecommunications network between a set top box and a terminal, said set top box having no capability for generating telecommunications signaling protocol messages, comprising the steps of:

in a centralized controller system shared by a plurality of set top boxes, storing data that when conveyed to a network controller of the telecommunications network will identify a path for a connection from said network to said set top box;

establishing a permanent virtual circuit (PVC) between a plurality of set top boxes, said plurality including said set top box, and said centralized controller system;

sending a service request message set from said terminal via said network to said centralized controller system requesting establishment of a connection between said terminal and said set top box;

responsive to receipt of said message from said terminal, signaling the network controller of said telecommunications network from said centralized controller system, using telecommunications network protocol messages, to establish said connection to said terminal and, using said data stored in said centralized controller system, to said set top box; and tuning said set top box, to one of a plurality of channels for receiving a signal from said terminal, via a message sent over said PVC from said centralized controller system;

wherein said first terminal lacks a capability for generating telecommunications network protocol messages for requesting said telecommunications network to establish a call.

* * * * *